(12) United States Patent
Suonsivu et al.

(10) Patent No.: US 7,266,084 B2
(45) Date of Patent: Sep. 4, 2007

(54) METHOD AND ARRANGEMENT FOR MAINTAINING AND UPDATING NETWORK ELEMENT CONFIGURATION IN AN XDSL NETWORK, AND AN XDSL NETWORK ELEMENT

(75) Inventors: Heikki Suonsivu, Espoo (FI); Juri Sipilä, Espoo (FI); Timo Rossi, Espoo (FI); Tomi Tirri, Espoo (FI); Hannu Aronsson, Helsinki (FI)

(73) Assignee: Wireless Lan Systems Oy, Espoo (FI)

( * ) Notice: Subject to any disclaimer, the term of this patent is extended or adjusted under 35 U.S.C. 154(b) by 968 days.

(21) Appl. No.: 09/753,236

(22) Filed: Dec. 29, 2000

(65) Prior Publication Data

US 2002/0085508 A1 Jul. 4, 2002

(51) Int. Cl.
*H04J 3/14* (2006.01)
*G06F 15/117* (2006.01)
(52) U.S. Cl. .................. 370/252; 370/254; 709/220
(58) Field of Classification Search ............... 370/254, 370/255, 256, 408, 396, 395.31, 400; 375/222, 375/223
See application file for complete search history.

(56) References Cited

U.S. PATENT DOCUMENTS

| | | | | |
|---|---|---|---|---|
| 5,495,479 | A * | 2/1996 | Galaand et al. ............ 370/404 |
| 5,889,856 | A * | 3/1999 | O'Toole et al. ......... 379/399.02 |
| 5,910,970 | A * | 6/1999 | Lu ............................. 375/377 |
| 6,108,350 | A | 8/2000 | Araujo et al. |
| 6,185,612 | B1 * | 2/2001 | Jensen et al. ............... 709/223 |
| 6,405,252 | B1 * | 6/2002 | Gupta et al. ................ 709/224 |
| 6,665,305 | B1 * | 12/2003 | Weismann .................. 370/401 |
| 6,678,721 | B1 * | 1/2004 | Bell ........................... 709/209 |
| 6,731,607 | B1 * | 5/2004 | Mantin ....................... 370/254 |
| 6,769,024 | B1 * | 7/2004 | Natarajan et al. .......... 709/224 |
| 6,894,983 | B1 * | 5/2005 | Lederman et al. .......... 370/252 |

FOREIGN PATENT DOCUMENTS

WO 9859462 12/1998
WO 9903255 1/1999

OTHER PUBLICATIONS

IEEE, "A Hierarchical Management Framework for Battlefield Network Management," by A. Sethi, P. Kalyanasundaram, C. Sherwin and D. Zhu, 1997, pp. 1239-1243.

* cited by examiner

*Primary Examiner*—Chi Pham
*Assistant Examiner*—Soon D. Hyun
(74) *Attorney, Agent, or Firm*—Alfred A. Fressola; Ware, Fressola, Van Der Sluys & Adolphson, LLP

(57) ABSTRACT

A method and arrangements are disclosed for distributing configuration information in an xDSL network that comprises network elements on certain hierarchical levels and a network managing station. There is transmitted a request for configuration information from a first network element located on a first hierarchical level to a second network element located on a second hierarchical level. The second hierarchical level is above the first hierarchical level in the xDSL network, but the second network element is other than the network managing station. The second network element decides whether it is appropriate to read the configuration information requested in the request for configuration information from a configuration memory of the second network element. In case it is decided to be appropriate, the configuration information requested in the request for configuration information is read from a configuration memory of the second network element and transmitted to the first network element.

10 Claims, 7 Drawing Sheets

METHOD AND ARRANGEMENT FOR MAINTAINING AND UPDATING NETWORK ELEMENT CONFIGURATION IN AN XDSL NETWORK, AND AN XDSL NETWORK ELEMENT

TECHNICAL FIELD

The invention concerns generally the technology of maintaining and updating configuration information that determines certain operational characteristics of the elements of a communications network. Especially the invention concerns the technology of maintaining and updating configuration information for the network elements of an xDSL network.

BACKGROUND OF THE INVENTION

The acronym xDSL refers collectively to a number of variations of the DSL (Digital Subscriber Line) technology, which aims at utilizing the information transmission capability of ordinary copper wires to the ultimate possible extent. Known variations that go under the umbrella definition of xDSL are at the priority date of this patent application ADSL (Asymmetric Digital Subscriber Line), CDSL (Consumer DSL, registered trademark of Rockwell International Corp.), G.Lite (also known as DSL Lite, splitterless ADSL, and Universal ADSL; officially ITU-T standard G-992.2), HDSL (High bit-rate DSL), RADSL (Rate-Adaptive DSL), SDSL (Symmetric DSL), VDSL (Very high data rate DSL) and even to some extent UDSL (Unidirectional DSL), which is only a proposal, and IDSL (ISDN DSL), which is actually closer to ISDN (Integrated Services Digital Network).

FIG. 1 illustrates the known hierarchical structure of an xDSL network. In this description we will refer to the levels of the structure as level 1, level 2, level 3 and level 4. Level 1 comprises the user-end devices, of which devices 101, 102, 103, 104, 105 and 106 are shown in FIG. 1. The number of devices on level 1 can be very large in a fully deployed xDSL network, since there is at least one user-end device per each subscriber. The task of a user-end device is to act as a gateway between an xDSL line 107 and the user's own local network; the term "local network" should be understood widely so that it covers also a single computer device at the user's. On level 2 there are the lowest-level xDSL switches that are in direct connection with end-user devices and concentrate the connections to and from them into a backbone network. xDSL switches 111, 112 and 113 are shown. The number of lowest-level xDSL switches is still relatively high: there may be for example one lowest-level switch per 30 user-end devices.

Level 3 comprises higher-level xDSL switches 121 that act as multiplexers/demultiplexers between connections 114 to several lowest-level xDSL switches and a high-capacity trunk network 122 such as an ATM (Asynchronous Transfer Mode) network. The xDSL switches are also known as DSLAMs (DSL Access Multiplexers). The number of hierarchical levels that consist of xDSL switches is in general not limited but depends on such factors as the geographical coverage of the network, number of subscribers and overall architecture of the network.

Level 4 comprises one or more network managing stations 131 the task of which is to maintain databases 132 of configuration information for all network elements in the xDSL network. A network managing station 131 also offers the means for the operator of the network to manage and control the operation of the whole xDSL network. In a small xDSL network one of the xDSL switches (DSLAMs) can also act as a network managing station.

In addition to the so-called active network elements shown in FIG. 1 the xDSL network may contain other devices such as repeaters and amplifiers. However, these are known in the xDSL technology as "passive" devices and are not important to the scope of the present invention.

Configuration information is a general term that means all such information that an active network element in an xDSL network needs for properly fulfilling its functional tasks in the network. The scope of the concept "configuration information" is not meant to be limited further in the present patent application, because the invention is equally applicable both to configuration information known at the priority date of the application and to future extensions of the concept. As an example, a user-end device needs to know, how the local network of the user is coupled to the outside world and what kind of limitations are applicable to communications through the xDSL connection. Lowest-level xDSL switches need to know, which subscribers are connected and what is the level of service and data transmission rate that should be provided to each subscriber. Similarly higher-level xDSL switches need to know, with which lower-level elements they are communicating with and what are the characteristics of each of these connections.

In a prior art xDSL network such as the one shown in FIG. 1 it has been customary to store all configuration information centrally in the database 132. Changes in configuration information have required the intervention of a trained person who sits at the network management station 131 and types in the commands for changing the configuration. Each time when a network element needs to be configured anew, or when a network element needs to revert to a piece of configuration information that existed previously but has become somehow temporarily unavailable, the network element must establish a communication connection to the network management station. In a worst case the configuration of a network element can not be changed or restored before a human operator has paid attention to the situation at the network management station and taken appropriate measures. A single fault at level 4 can disable a whole xDSL network because configuration information can not be obtained.

SUMMARY OF THE INVENTION

It is an object of the present invention to provide a method and the hardware associated thereto for maintaining and updating configuration information in an xDSL network without the above-mentioned problems of prior art solutions.

The objects of the invention are achieved by distributing the storage of configuration information onto hierarchical levels in the xDSL network. Certain aspects of the invention are also achieved by defining limited rights for changing configuration information and distributing such limited rights among the network elements, as well as by arranging for the checking of such rights before making any changes in configuration information that previously was found to be valid.

A first aspect of the invention is a method for distributing configuration information in an xDSL network that comprises network elements on certain hierarchical levels and a network managing station. The method according to the first aspect of the invention performs the steps of transmitting a request for configuration information from a first network element located on a first hierarchical level to a second network element located on a second hierarchical level, which second hierarchical level is above the first hierarchical level in the xDSL network but which second network element is other than the network managing station, deciding, at the second network element that is other than the network managing station, whether it is appropriate to read the configuration information requested in the request for configuration information from a configuration memory of the second network element, and in case it is decided to be appropriate, reading the configuration information requested in the request for configuration information from a configuration memory of the second network element and transmitting the configuration information that was read from the configuration memory of the second network element to the first network element.

A second aspect of the invention is a method for achieving configuration information into a network element of an xDSL network that comprises network elements on certain hierarchical levels. The method according to the second aspect of the invention performs the steps of transmitting a request for configuration information from a first network element located on a first hierarchical level towards a second network element located on a second hierarchical level, which second hierarchical level is above the first hierarchical level in the xDSL network, deciding, at the first network element, whether it is appropriate to read the configuration information requested in the request for configuration information from a configuration memory of the first network element, and in case it is decided to be appropriate, reading the configuration information requested in the request for configuration information from a configuration memory of the first network element.

A third aspect of the invention is a method for effecting changes into configuration information in an xDSL network that comprises network elements on certain hierarchical levels and a network managing station. The method according to the third aspect of the invention performs the steps of at a certain first network element that is other than the network managing station and is located on a certain first hierarchical level, receiving a command for changing a piece of configuration information that pertains to a second network element that is located on a certain second hierarchical level, which second hierarchical level is below the first hierarchical level in the xDSL network and storing said piece of configuration information at a configuration memory of the first network element in a form that results from executing said received command.

A fourth aspect of the invention is a network element of an xDSL network. The network element according to the fourth aspect of the invention is a network element other than a network managing station and is arranged to communicate with other xDSL network elements that are located on lower hierarchical levels in the xDSL network and with at least one xDSL network element that is located on a higher hierarchical level in the xDSL network, and which network element is arranged to store configuration information pertaining to the network element; wherein the network element is also arranged to store configuration information pertaining to at least one xDSL network element that is located on a lower hierarchical level in the xDSL network.

A fifth aspect of the invention is an xDSL network. The network according to the fifth aspect of the invention is an xDSL network comprising network elements on certain hierarchical levels and a network managing station, wherein the improvement lies in that a number of other network elements than the network managing station are arranged to store configuration information pertaining to network elements that are located on lower hierarchical levels in the xDSL network than the network element at which the configuration information is stored.

For the purposes of the invention we assume that there exists a generally acknowledged format of electronically storing configuration information and configuration commands. In this format (or in a transport format closely associated thereto) it is possible to communicate configuration information and configuration commands between the active network elements of an xDSL network. Each network element has its own configuration information stored locally in a suitable memory. According to the invention, also a number of other network elements, which are above a certain network element in the xDSL hierarchy but do not implement the actual network management functionality, store configuration information related to said certain network element. This makes it possible for a network element to obtain configuration information from higher levels without necessarily communicating with a network management station at all.

According to an aspect of the invention it is possible to make changes in configuration information also at other levels of the network hierarchy than at the network management level. In order to keep control on such changes there are defined certain authorisations that determine, who is allowed to change what. Changes that are made at a lower level are communicated in all necessary directions, which includes communicating changes onto upper levels in the network hierarchy. Protection is most easily provided against unauthorised attempts of changing pieces of configuration information by not accepting, at the other network elements, such changes in configuration information that appear to have been made without proper authorisation.

When a network element according to the invention receives a request for configuration information from a lower level in the hierarchy, it checks first whether the device making the request is on a list of known lower-level network elements. If this is the case, the device that received the request has the possibility of either conveying the request further up towards a network management station or to read from its memory a set of configuration information that has been previously stored as the configuration information regarding the device that sent the request. The embodiments of the invention encompass various rules that device that received the request can follow in making its decision. If the device that sent the request was previously unknown, no set of previously stored device-specific configuration information exists. In such a case a default configuration may be used instead.

The above-described system adapts itself automatically both to a situation where a network element powers up after a period of non-activity and just needs to reload a set of previously stored configuration information, and to a situation where a new network device is connected to the network without any prior knowledge in the network about its existence. The system works very well even in a case where a network device is disconnected from its previous location within the network and moved to another location. The system is scalable to different network sizes and architectures and poses little limitation to future additions to the contents or handling of configuration information.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 was described above within the description of prior art, so the following description of the invention and its advantageous embodiments will concentrate on FIGS. 2 to 10.

DETAILED DESCRIPTION OF THE INVENTION

Figure 2:
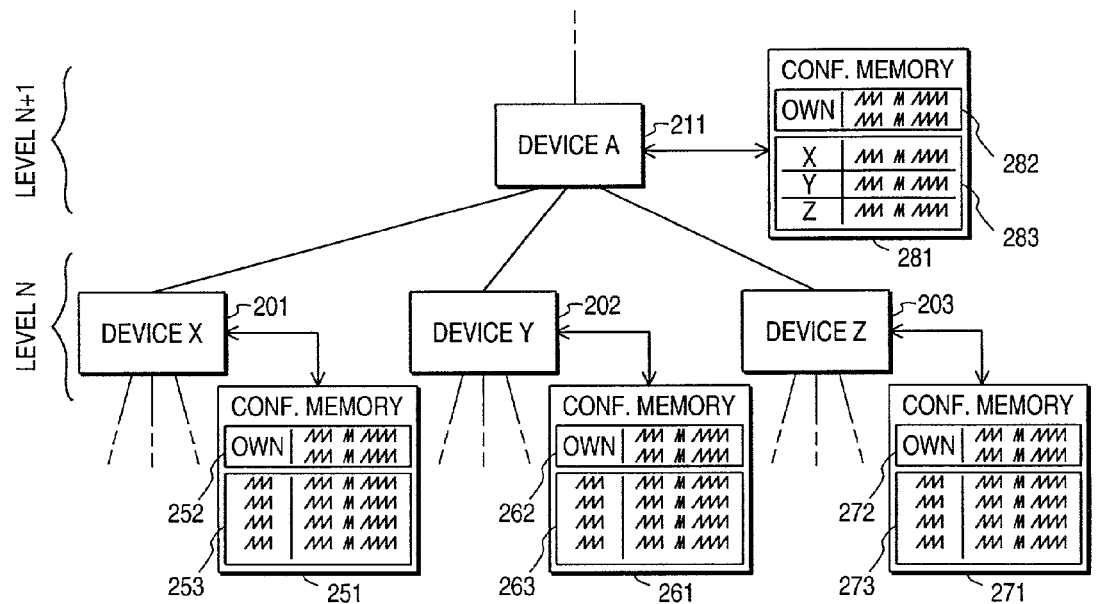
FIG. 2 illustrates schematically the storage of configuration information according to an embodiment of the invention.

FIG. 2 illustrates schematically a part of an xDSL network where active element X 201, active element Y 202 and active element Z 203 belong to a certain Nth level of the network hierarchy. Here N is a positive integer. On the next highest level, which is the (N+1)th level, there is an active element A 211 that has a connection to each of the elements X, Y and Z. Depending on the value of N, there may be further lower levels below the Nth level and upper levels above the (N+1)th level.

Each active network element X, Y, Z and A has a configuration memory 251, 261, 271 and 281 respectively. In each configuration memory there is an entry 252, 262, 272 or 282 respectively for storing the own configuration information of that particular network element. According to an aspect of the invention the configuration memory of each active network element contains also a part 253, 263, 273 or 283 respectively for storing entries that contain configuration information of other network elements, in particular such other network elements that in the network hierarchy are below the network element that stores the configuration information.

At the priority date of this patent application it is regarded as most advantageous if each active network element is able to store, in addition to its own configuration information, the configuration information of all those network elements that are below it on the next or any further lower level of the network hierarchy. We may designate such an embodiment of the invention as the "all below" embodiment. However, the invention finds also certain limited applicability in an "only next lower" embodiment where each active network element stores, in addition to its own configuration information, the configuration information of only those network elements that are immediately below it on the next lower level of the network hierarchy. Variations between "all below" and "only next lower" are also possible: for example in an "only N lower" embodiment each active network would store the configuration information of only those network elements that are not further than N levels down from it in the network hierarchy, where N is a positive integer larger than one. Later in this description we will analyse in detail, what is the effect of the extent into which the storing of configuration information for lower-level network elements is extended.

Figure 1:
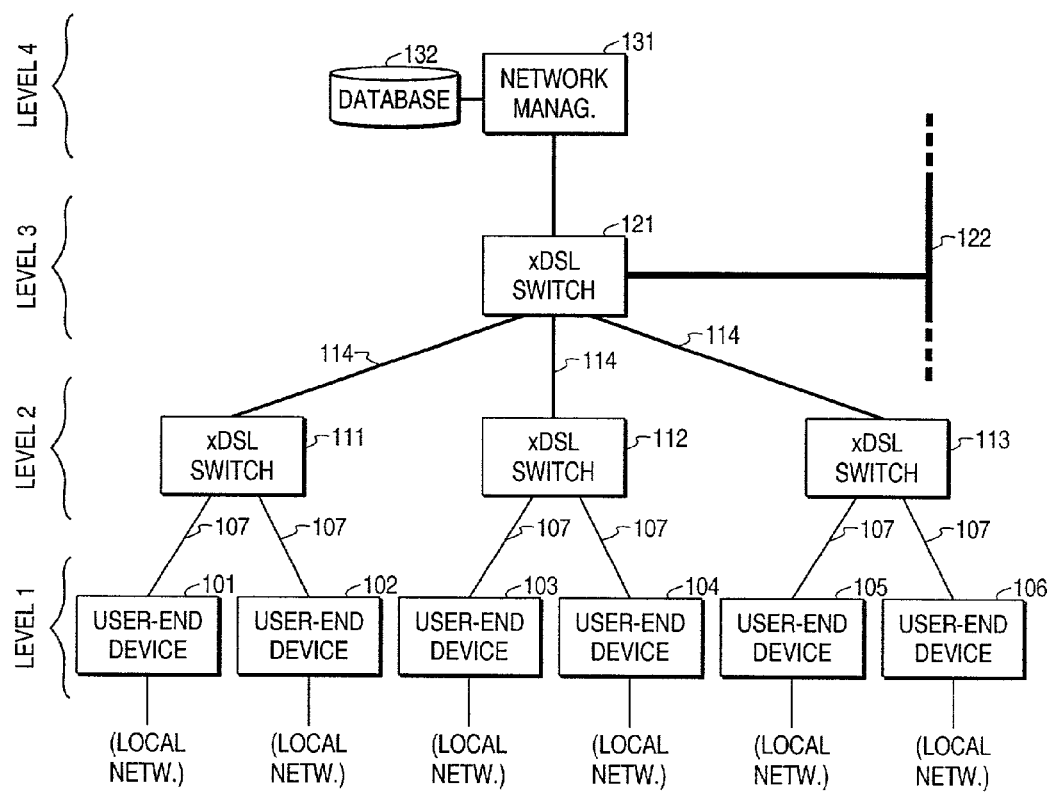
FIG. 1 illustrates a known xDSL network.
Figure 3:
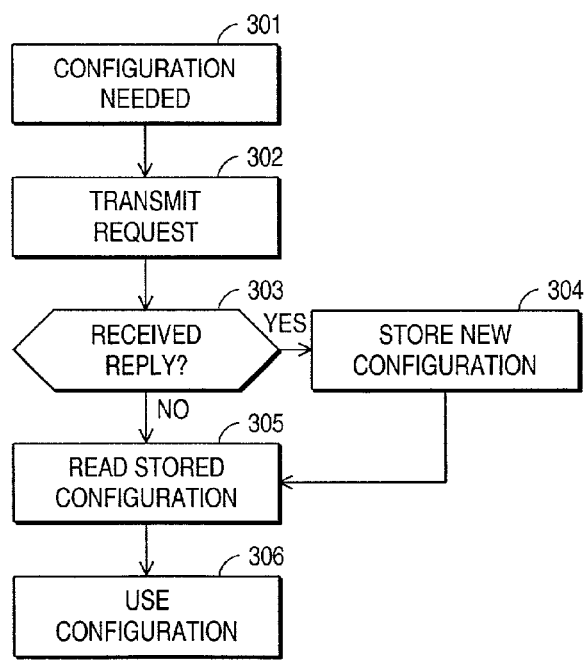
FIG. 3 illustrates a method for requesting configuration information.

FIG. 3 is a simplified flow diagram that illustrates the operation of a network element in a situation where it needs to reconfigure itself. A network element that executes the method of FIG. 3 may be located anywhere on levels 1, 2 or 3 in the known network hierarchy illustrated in FIG. 1. At step 301 it notes that it needs some configuration information. Such a finding typically occurs at a power up situation where the network element has been temporarily switched off and intends to resume normal operation. Step 301 may also occur when an error is detected in a set of locally stored configuration information, due to e.g. a memory malfunction, or at any other occasion that causes the network element to consider reloading its configuration information. At step 302 the network element transmits a request for configuration element to a network element on a higher hierarchy level, most typically to the network element that is immediately above it in the network hierarchy and with which it has a communication connection during normal operation of the network. At step 303 the network element examines, whether it received a reply from the network element to which it transmitted the request. Timers, frame counters or other arrangements known as such may be employed so that the network element does not make the decision referred to at step 303 immediately but only after having waited for a certaion delay period. The suitable length of such a delay period may be determined through experimenting.

If the network element received a reply containing a fresh set of configuration information from the higher-level device it was communicating with, it stores this new set of configuration information locally at step 304. If a reply was not found to come, it refers to previously stored configuration information. It is advantageous to have a nonvolatile configuration memory in each active network element for storing the configuration information even over swithed-off periods. Referring to previously stored configuration information may also mean reverting to some kind of a backup copy of previously stored configuration information in a case where a working copy was found to contain an error. In any case, whether the network element received a reply and stored the new information or not, it reads the stored configuration information at step 305 and starts using it at step 306.

Figure 4:
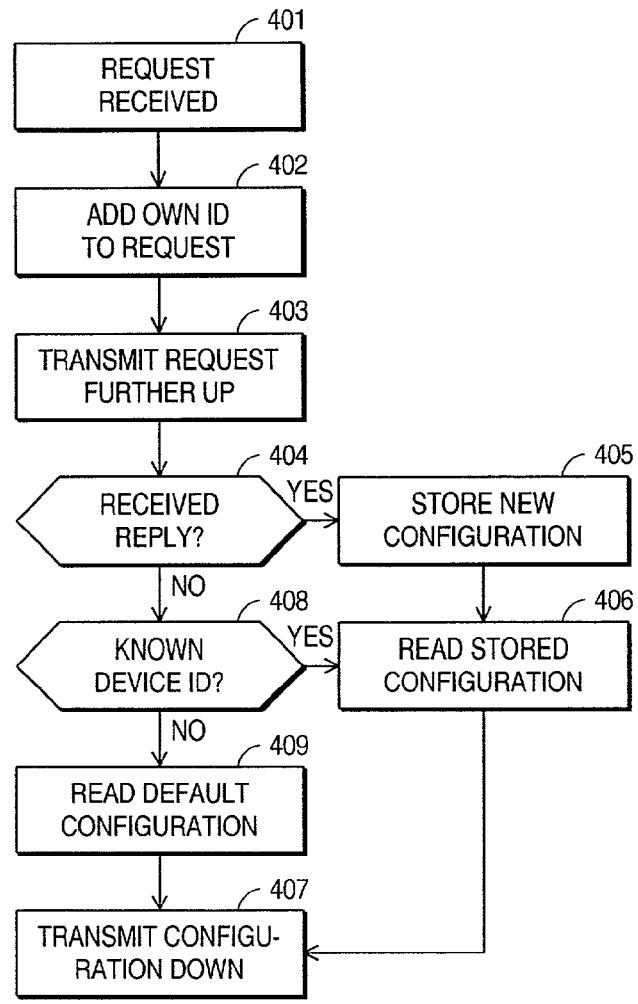
FIG. 4 illustrates a method for handling requests for configuration information.

FIG. 4 is a simplified flow diagram that illustrates the operation of a network element in a situation where it receives a request for configuration information from a network device that is below it in the network hierarchy. In the known hierarchy structure of FIG. 1 this means that the operation of an active network element on level 2 or level 3 is considered.

Figure 5:
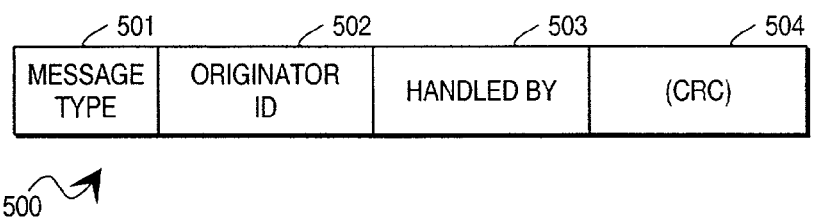
FIG. 5 illustrates an exemplary message structure.

At step 401 the network element receives a request for configuration information. For the purposes of building into the request message a list of those network elements that have handled it, the network element adds its own unique identifier into the request at step 402. A schematic example of a request message is shown in FIG. 5: the message 500 includes a message type field 501 for indicating that it is a request for configuration information, an originator ID field 502 for holding a unique identifier of the network element that is in need for configuration information and has originally transmitted the request, a "handled by" field 503 for holding, preferably sequentially, the unique identifiers of the devices that have handled the request since it was originally transmitted, and possibly a CRC (Cyclic Redundancy Check) field 504 for holding a checksum that a receiving device can use in a way known as such to check whether any transmission errors have occurred. If a checksum is used, it needs to be replaced with a recalculated checksum every time when a new device identifier is added into the "handled by" field 503, unless this field is left out of the range over which the checksum is calculated. The message structure of FIG. 5 is exemplary and does not limit the scope or applicability of the invention: for example no separate originator ID and "handled by" fields are needed if we accept that the first (or last) device identifier in a "handled by" field is always the identifier of the originator. There may also be a field for the identifier of the intended final recipient, which is a network managing station. Such an identifier is not needed if there exists in the network an unequivocally defined network managing station for each branch of the tree-like network structure.

At step 403 the network element forwards the request, which now includes also the unique identifier added into it at step 403, further up in the network hierarchy. Preferably the network element forwards the request at step 403 to the network element that is immediately above it in the network hierarchy and with which it has a communication connection during normal operation of the network. At step 404 the network element examines, whether it received a reply from the network element to which it forwarded the request. Timers, frame counters or other arrangements known as such may again be employed so that the network element does not make the decision referred to at step 404 immediately but only after having waited for a certaion delay period. The suitable length of such a delay period may again be determined through experimenting.

If the network element received, from the higher-level device it was communicating with, a reply containing a fresh set of configuration information for the lower-level network element that was the originator of the request, it stores the new configuration at step 405. Naturally the configuration information is stored at step 405 to that part of the network element's configuration memory that holds stored copies of the configuration information of other network elements (see 253, 263, 273 and 283 in FIG. 2). The stored configuration information is marked (indexed) with the unique identifier of the lower-level network element that was the originator of the request. The network element the operation of which is described in FIG. 4 has received this identifier originally with the request it received from a lower level at step 401. The same identifier should also appear in the reply the reception of which caused a transition from step 404 to step 405. At step 406 the network element reads the stored configuration information, and at step 407 it transmits it further down in the network hierarchy towards the network element that had originally asked for new configuration information.

If the network element does not receive a reply from a higher level at step 404, it checks at step 408, whether the unique identifier in the originator ID field of the request was known in the sense that a set of configuration information has been previously stored and indexed with this identifier. If the result of the check is positive, the network element reads the previously stored device-specific configuration information from the memory at step 406 and transmits it at step 407 as it would have done with configuration information received in a reply. If, at step 408, the originator ID field of the request was found to contain a previously unknown device identifier, the network element reads at step 409 some default configuration information from an appropriate memory location and uses it as the configuration information it transmits downwards at step 407.

Figure 6:
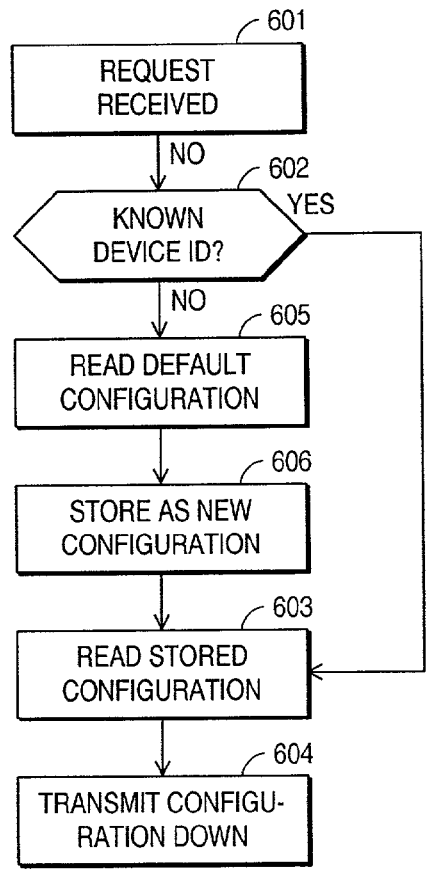
FIG. 6 illustrates another method for handling requests for configuration information

FIG. 6 is a simplified flow diagram that illustrates the operation of a network managing station in a situation where it receives a request for configuration information from a network device that is below it in the network hierarchy. At step 601 the network managing station receives a request for configuration information. At step 602 it checks, whether the unique identifier in the originator ID field of the request is known in the sense that a set of configuration information has been previously stored and indexed at the database of the network managing station with this identifier, i.e. whether the originator of the request is a known device that has already been active at some time somewhere in the xDSL network managed by the network managing station. If the result of the check is positive, the network managing station reads the previously stored device-specific configuration information from the database at step 603 and transmits it at step 604 downwards in the network hierarchy in a message that can be called a configuration information reply message. An exemplary form of this message is shown schematically in FIG. 7.

Figure 7:
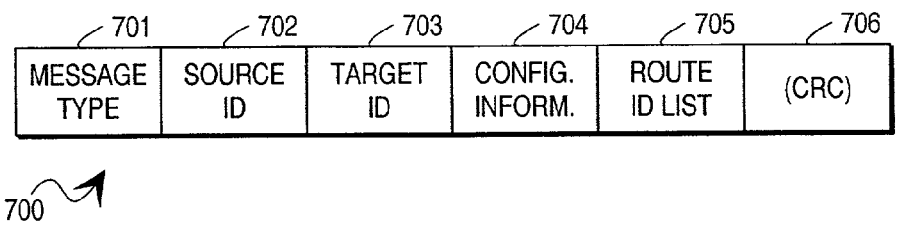
FIG. 7 illustrates another exemplary message structure.

The message 700 of FIG. 7 comprises a message type field 701 for containing a type identifier telling that the message is a configuration information reply message. It comprises also a source ID field 702 for holding the unique identifier of the network element that composed the message, i.e. from the database of which the configuration information carried in the message was read. There is also a target ID field 703 for holding the unique identifier of the network element that is the intended final recipient of the configuration information. The actual configuration information is contained in a field 704 of its own. For the purposes of correctly routing the message to its final recipient it is advantageous to have in the message a route ID list field 705 that contains sequentially the unique identifiers of those network elements through which the message is to be transmitted. The network management station can obtain the contents of the route ID list field 705 most easily by reading the identifiers from the "handled by" field in the request message it received. However, it is also possible that it has stored a device-specific reply route for transmitting configuration information reply messages for each network element. In such a case the contents of the route ID list field 705 need not define the same route through which the request message came. It is possible to use a CRC (Cyclic Redundancy Check) field 706 as a part of the message 700 for holding a checksum that a receiving device can use in a way known as such to check whether any transmission errors have occurred. The message structure shown in FIG. 7 does not limit the scope and applicability of the invention since many other alternative structure can be used to achieve the same technical effect.

The network managing station may find at step 602 that the network element that asked for configuration information is a "new" network element. This means that the network managing station does not find previously stored configuration information that would have been indexed with the device identifier that appeared in the originator ID field of the request message. In that case there occurs a transition from step 602 to step 605 where the network managing station reads some default configuration information from an appropriate memory location. At step 606 the network managing station copies the default configuration information into the database and indexes it with the "new" device identifier. In other words, the network managing station generates a new database entry for the network element that asked for configuration information. After that it reads the stored configuration information at step 603 and transmits it at step 604 as it would have done for configuration information that existed in the database already when the request arrived.

Before the network managing station proceeds in issuing default configuration information for a new network element, it may perform certain checks in order to ensure that the new network element can be accepted to the network. For example, the network managing station may check whether the same device identifier that appeared in the originator ID field of the request message has already been reserved by some other, apparently active network element. With "apparently active" we mean that said existing appearance of the device identifier in the network managing station's database does not mean that actually the same network element that is the originator of the request has previously been at some other location in the network from which is should now be deleted because it is requesting for configuration at a new location. Additionally or alternatively the network managing station may check whether the device identifier belongs to a certain predefined group of allowable identifiers, i.e. whether the device identifier conforms to the definitions of an acceptable device identifier space. There may also exist limitations that define, which network elements are allowed at which locations in the network, so the checks performed by the network managing station may include one where it checks that the network element that requests configuration information for operating at a certain location is allowed to operate in that location. If any of such checks fails, the network managing station should refuse from providing configuration information to the network element that requested it.

Routing the configuration information reply message from the network managing station to the network element that asked for configuration information takes place in the order of the identifiers in the route ID list field 705. A most straightforward way of updating the contents of the route ID list field 705 is such where each network element that receives the message en route, without being its intended final recipient, deletes its own identifier from the route ID list field 705 and forwards the message to the network element identified by the next identifier in the field. If a checksum is used, it needs to be replaced with a recalculated checksum every time when a device identifier is deleted from the route ID list field 705, unless this field is left out of the range over which the checksum is calculated.

In a case where a network element that is not a network managing station decides to "draw from own stores", i.e. to read and transmit downwards configuration information from its own configuration memory, for example because it did not receive a reply from a higher level, the message structure shown in FIG. 7 can still be used. It may be advantageous to define two distinct message type identifiers to make a difference between a configuration information reply message coming all the way from a managing station from one coming from a lower level, but this is not obligatory: the contents of the source ID field 702 serve anyway to identify the network element that originally composed the configuration information reply message. A network element that is not a network managing station may apply similar checks that were discussed above in association of the operation of a network managing station to ensure that configuration information is only provided to such network elements that have been appropriately identified by an acceptable identifier and that request to be configured at an allowable location within the network.

In the foregoing we have concentrated on the "all below" embodiment of the invention where each active network element stores the configuration information of all other active network elements that are below it in the tree-like hierarchical structure of the network regardless of their distance in levels. The given description is easily generalised to cover also the "only next lower" embodiment where each active network device only stores the configuration information of the active network elements on the immediately lower level. The only change is that in the method illustrated in FIG. 4, the steps 405 and 406 are only executed if the network element handling a piece of configuration information notes that the configuration information pertains to a network device that is immediately below it in the network hierarchy, i.e. belongs to the group of network elements for which it should have configuration information in store. Otherwise the network element just follows the flow illustrated in FIG. 4 through said steps without executing them.

A factor that would be in favour of an "only next lower" or "only N lower" embodiment of the invention is achievable saving in memory space. In a very extensive "all below" network where the number of levels is large and each level includes a great number of network elements, a network element relatively high up in the network hierarchy will need a large amount of memory to store the configuration information of all network elements that are below it in the network hierarchy. Limiting the number of lower levels for which configuration information needs to be stored serves to limit the memory requirements.

However, the "all below" embodiment has certain advantages that relate for example to redundancy in network connections. In many network architectures it is possible to bypass a malfunctioning network element and contact for example a network element in a next higher level, or to route a communication connection through a different route at a lower level, however so that the diversion converges with the original route at some higher level. In an "all below" network it is very probable that even if an alternative route has to be taken at a lower level, said alternative route going through certain network devices that have not been previously communicating with the lower-level network element for which configuration information is needed, sooner or later a level will be reached where the alternative route converges with the original one. The network element that serves as the convergence point possesses and can use the appropriate configuration information regardless of the route through which the request message came at the lower levels.

In association with FIG. 4 it was assumed that the network element only "draws from own stores" if it did not receive a reply from a higher level in the network (alternative NO at step 404). However, it is possible to define also other kind of rules which cause a network element to read the requested configuration information from a local storage rather than forward information obtained from higher levels. This kind of rules typically rely on an assumption that the configuration information itself has not changed: a network element assumes that the configuration information it has in store is valid, so that the reason that caused the lower-level network element to request configuration information is more probably related to loss of data at the lower level rather than changed configuration conditions. For example, every piece of stored configuration information may have a time stamp associated thereto, so that the time stamp indicates the time when the configuration information was last modified. We may define that each network element will inherently regard all such configuration information as valid for which the time stamp shows that it is not older than a certain time limit. A person skilled in the art can easily define other rules that define the concept of inherent reliability.

Let us assume that inherent reliability of configuration information has been defined according to certain rules. In that case, each time when a network element receives a request message from a lower level network element that it recognizes by device identifier, it checks, whether the previously stored configuration information for this particular lower-level network device is still inherently valid. If it is, the network device in question does not even try to obtain responses from any higher levels in the network hierarchy, but simply composes the configuration information reply message by itself. Not even a notification message needs to be sent to the higher levels, unless the network aims at documenting the frequency at which request messages occur. Only if there is no previously stored, inherently valid configuration information stored at the network element, it forwards the request message to higher levels according to what was described previously in association with FIG. 4.

Next we will analyse the applicability of the invention to a situation where a network element changes its logical location in the network. With a change in logical location we mean that after the change the route between the network device and the network managing station goes through different higher-level network elements than previously. A change in logical location is often, but not necessarily, associated with a change in physical location.

When a change in logical location has occurred and the network element in question is switched on for the first time in its new logical location, it finds itself to be in a situation where it needs configuration information. It starts executing the method illustrated previously in FIG. 3, i.e. it transmits a request message for requesting configuration information. No changes are required to the method of FIG. 3 despite of the fact that the network device has changed logical location. Also the network elements of higher levels through which the request message is routed can act exactly as was described earlier in association with FIG. 4. However, certain additions may be necessary to the previously described operation of the network managing station.

Figure 8:
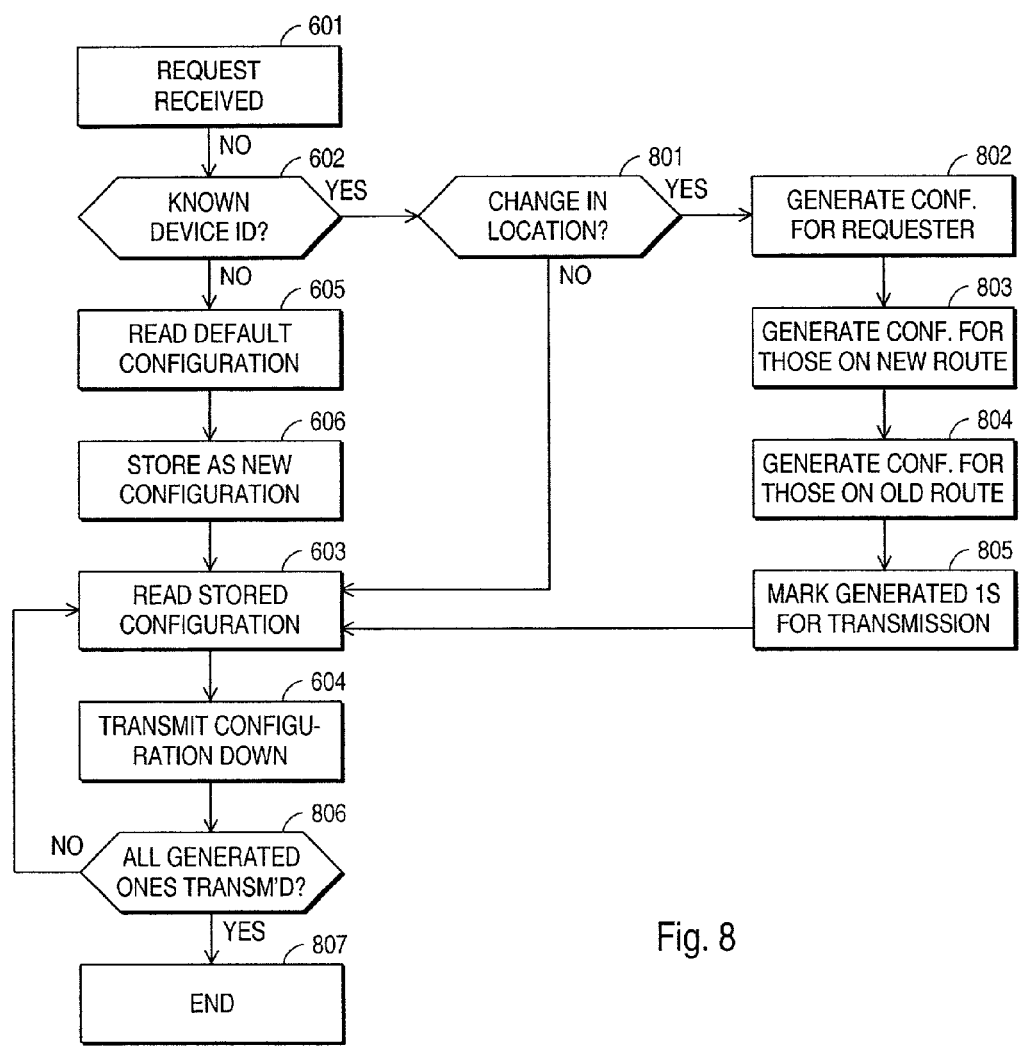
FIG. 8 illustrates another method for handling requests for configuration information.

FIG. 8 is a simplified flow diagram that illustrates the operation of the network managing station when it takes potentially occurring changes in logical location into account. Steps 601, 602, 603, 604, 605 and 606 are basically the same as in FIG. 6. However, as a response to a positive finding at step 602 the network managing station examines at step 801, whether the network element that requests configuration information has changed logical location. The examination is based on the chain of sequential device identifiers that appear in the "handled by" field of the request message. The network managing station has previously stored, along with the actual configuration information of that network element, the chain of device identifiers that describes the connection between the network element and the network managing station through the network hierarchy. If the device identifiers in the newly received "handled by" field differ from the stored sequence, a change in logical location has occurred. A negative finding would have led directly to step 603 similarly as in FIG. 6.

A positive finding at step 801 leads to step 802 where the network managing station generates automatically a set of new configuration information that takes into account the network element's new logical location. The condition that the generation of new configuration information happens automatically is not imperative, but it helps greatly in lessening the need for manual reconfiguration at the network managing station. The fact that the network device has changed logical location means that certain changes may be needed also to configuration information regarding both those network elements that belong to the new "route", i.e. through which the network element in question now communicates with the network managing station, and those network elements that belonged to the old "route", i.e. through which the network element in question used to communicate with the network managing station before the change. The required new sets of configuration information are generated at steps 803 and 804 respectively.

All generated sets of new configuration information need to be transmitted from the network managing station to the appropriate network elements. This transmission is schematically illustrated in the flow diagram of FIG. 8 so that the newly generated sets of configuration information are marked for transmission at step 805, and the loop consisting of steps 603, 604 and 806 is circulated until all marked sets of configuration information have been transmitted.

The transmission of new configuration information also to those network elements that actually had not requestes it brings us to the subject of forcing changes in configuration information through network managing actions. A most straightforward way of defining such forced changes is to state that every time when a network element receives a message of the type shown in FIG. 7, it handles it in a similar way regardless of whether a corresponding request message has existed or not. In other words, all messages of this kind are forwarded through the network towards the recipient indicated in the target ID field irrespective of whether a request message has travelled in the opposite direction previously, and each time a message of this kind reaches its indicated target device, that target device accepts and stores the configuration information contained therein even if it had not requested any changes to its configuration.

What was said above about a network managing station reacting to a change in logical location can easily be generalised to cover those situations whese a network element that is not a network managing station "draws from own stores", especially when the change in logical location has taken place from one branch to another branch of the tree-like network structure extending downwards from said network element. One of the rules that a network element uses in deciding, whether to forward a request message further up or whether to answer it by itself may be such where all such changes of logical location that only involve subtrees of the network device in question can be handled locally, whereas changes in logical location where a network element either appears from an unknown part of the network or disappears from the subtree in question must be referred upwards to a higher level in the network hierarchy.

A change in logical location always involves changes in the configuration information, at least in the list of device identifiers that defines the route between the network element that changed logical location and a network managing station (in a wide sense this list is also a part of configuration information). Above we noted how a change in logical location can be handled by a higher-level network element that "draws from own stores" rather than by a network managing station. This requires that the higher-level network element is authorised to make changes in configuration information. The principle of distributing the storage of configuration information according to the invention makes it possible to distribute also rights of changing configuration information. Here we do not have to limit the discussion to configuration changes that involve a change in logical location: in principle it is possible to authorise any network element to make any kind of changes.

According to an advantageous embodiment of the invention a set of stored configuration information includes some indications that tell, who is allowed to make what kind of changes in the configuration information. Any network element may comprise a user interface or even a number of user interfaces, through which a human operator may make changes to the configuration information of that particular network element, as well as to the configuration information of network elements that are below that particular network element in the network hierarchy—these are after all stored in the configuration memory of that particular network element. The changes made this way must naturally be such that a proper authorisation exists for making them at that particular network element and/or at that particular level in the network hiearchy. Authorisations for making changes may be general so that e.g. everybody that knows a certain password is allowed to make all kind of changes, or they may be very specific so that for each and every configuration parameter there are separate exact definitions of who, how and when is allowed to make changes. The latter approach is regarded as more advantageous at the priority date of this patent application.

Figure 9:
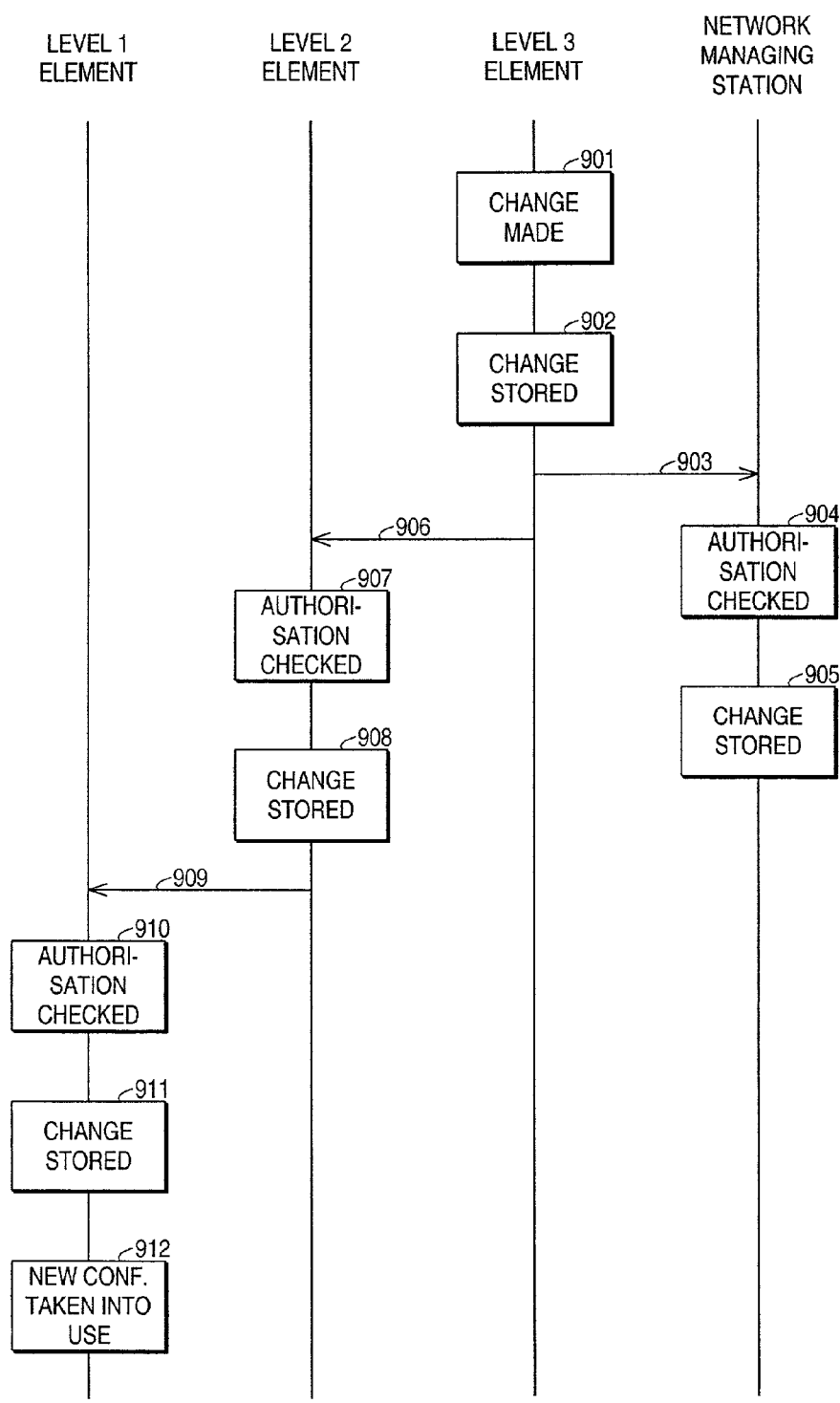
FIG. 9 illustrates a process of handling configuration information and FIG. 10 illustrates yet another exemplary message structure.

Changes of configuration information that are made somewhere else than at the network managing station must naturally not result in a situation where inconsistent sets of configuration information for a certain network element would reside at various storage locations in the network. In order to avoid such inconsistencies there must exist a mechanism for communicating the changes to all locations where stored copies exist for the configuration information that was changed. FIG. 9 is a schematic message exchange diagram that illustrates the communication of changes. At step 901 the configuration information of a level 1 network element is changed; the change is accomplished at a level 3 network element that is two levels up in the network hiearchy from the device the configuration of which is changed. At step 902 the level 3 network element stores the changed configuration information in that part of its own configuration memory where it has the configuration of those lower-level network devices that are below it in the network hierarchy. At step 903 the level 3 network element transmits an information message upwards in the network hierarchy. Because the next higher level is already represented by a network managing station, the information message goes directly to it.

Figure 10:
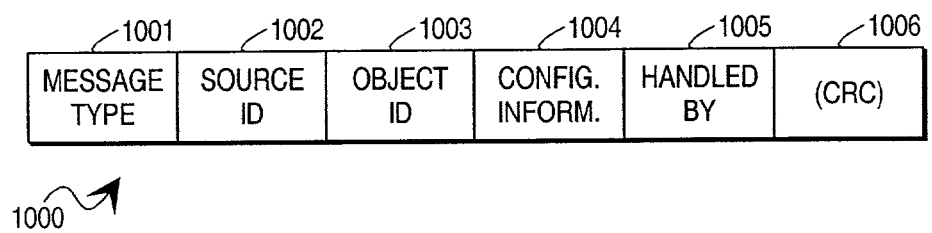

The form of the information message transmitted upwards in the network hierarchy may be for example that shown in FIG. 10. In the message 1000 there is a message type field 1001 the contents of which indicate that the message is an information message. A unique device identifier in the source ID field 1002 indicates the network element at which the change was made, and another unique device identifier in the object ID field 1003 indicates the network element the configuration of which was changed. The new set of configuration information is contained in an appropriate field 1004, and because the message is one of those transmitted upwards in the network hierarchy there is a "handled by" field 1005 into which all such network elements add their own unique identifiers through which the message goes on its way to a network managing station. A checksum may be included in an appropriate field 1006. Similarly with the request message shown in FIG. 5 the information message of FIG. 10 may contain an identifier of the intended final recipient, unless the use of such an identifier is made unnecessary by the fact that there is only one unequivocally defined network managing station that is the final recipient of all messages transmitted upwards.

At step 904 the network managing station checks that the changes did not violate any rules that require authorisation. If no violations are found, the network managing station stores the new configuration information appropriately indexed into its database at step 905. If the change had been an unauthorised one, the network managing station would not have accepted it.

At step 906 the level 3 network element transmits the new configuration information downwards in the network hierarchy. The mutual order of steps 903 and 906 is not important and they could as well be executed in a different order. The message transmitted at step 906 may be exactly the same as in FIG. 7. The level 3 network element has read the contents of the route ID list field from its own configuration memory. Steps 907 and 908 are similar checking and storing steps in the level 2 network element as steps 904 and 905 in the network managing station. At step 909 the level 2 network element forwards the message to the final recipient after having deleted its own identifier from the route ID list field. After an authorisation check at step 910 the level 1 network element stores the new configuration information at step 911 and takes it into use at step 912.

It is possible and often even necessary to program the network elements so that if needed, they may be self-sustaining without having to resort to configuration commands from higher network levels. The feature of self-sustainability may be needed for example in a small network, where only network elements of level 1 communicate with each other without involving any network devices from level 2 or higher at all. In that case every network device must allow all configuration changes to be made at level 1. This feature may be automatised by defining for each positive integer K that if a network element of level K finds that it is communicating with another network element of level K instead of a network element of level K+1, it immediately allows all configuration changes to be made at its own level.

Only manually entered changes in configuration information were treated in the foregoing description. The also invention allows changes to be made automatically by suitable authorised network elements. Certain parts of configuration information may for example be time-dependent, so that a network element changes such parts after a time limit has lapsed, repeatedly in certain time intervals or in any other time-dependent way. Changes in configuration information may also become necessary due to the observed performance of certain network elements: for example a network element that is found to repeatedly fail in communication due to insufficient service level may be granted a higher default service level by changing the appropriate configuration information.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The invention claimed is:

1. A method for distributing configuration information in an xDSL network that comprises network elements on certain hierarchical levels and a network managing station, the method comprising the steps of:

transmitting a request for configuration information from a first network element located on a first hierarchical level to a second network element located on a second hierarchical level, which second hierarchical level is above the first hierarchical level in the xDSL network but which second network element is other than the network managing station, deciding, at the second network element that is other than the network managing station, whether it is appropriate to read the configuration information requested in the request for configuration information from a configuration memory of the second network element, and in case it is decided to be appropriate, reading the configuration information requested in the request for configuration information from a configuration memory of the second network element and transmitting the configuration information that was read from the configuration memory of the second network element to the first network element.

2. A method for distributing configuration information in an xDSL network that comprises network elements on certain hierarchical levels and a network managing station, the method comprising the steps of:

transmitting a request for configuration information from a first network element located on a first hierarchical level to a second network element located on a second hierarchical level, which second hierarchical level is above the first hierarchical level in the xDSL network but which second network element is other than the network managing station, as a response to receiving a request for configuration information from the first network element, the second network element forwards the request to a third network element located on a third hierarchical level, which third hierarchical level is above the second hierarchical level in the xDSL network;

the second network element examines whether a response is received from the third network element; and the second network element decides it is appropriate to read the configuration information requested in the request for configuration information from a configuration memory of the second network element if the response is not received from the third network element; and if it is appropriate for the second network element to read configuration information, the second network element:

reads the configuration information requested in the request for configuration information from a configuration memory of the second network element, and transmits the configuration information that was read from the configuration memory of the second network element to the first network element.

3. A method according to claim 2, wherein at the second network element it is decided to be appropriate to read the configuration information requested in the request for configuration information from a configuration memory of the second network element if a response is not received from the third network element before the end of a certain time limit.

4. A method according to claim 2, comprising the steps of:

in a case where a response is received from the third network element, storing a piece of configuration information contained in the response at the configuration memory of the second network element and forwarding a copy of the stored configuration information from the second network element to the first network element.

5. A method according to claim 1, comprising the step of:

as a response to receiving a request for configuration information from the first network element, applying a certain predefined rule at the second network element to decide, whether to forward the request from the second network element to a third network element located on a third hierarchical level, which third hierarchical level is above the second hierarchical level in the xDSL network, or whether to read the configuration information requested in the request for configuration information from a configuration memory of the second network element without forwarding the request from the second network element to the third network element.

6. A method for distributing configuration information in an xDSL network that comprises network elements on certain hierarchical levels and a network managing station, the method comprising the steps of:

transmitting a request for configuration information from a first network element located on a first hierarchical level to a second network element located on a second hierarchical level, which second hierarchical level is above the first hierarchical level in the xDSL network but which second network element is other than the network managing station, deciding, at the second network element that is other than the network managing station, whether it is appropriate to read the configuration information requested in the request for configuration information from a configuration memory of the second network element, and in case it is decided to be appropriate, reading the configuration information requested in the request for configuration information from a configuration memory of the second network element and transmitting the configuration information that was read from the configuration memory of the second network element to the first network element and as a response to receiving a request for configuration information from the first network element, applying a certain predefined rule at the second network element to decide, whether to forward the request from the second network element to a third network element located on a third hierarchical level, which third hierarchical level is above the second hierarchical level in the xDSL network, or whether to read the configuration information requested in the request for configuration information from a configuration memory of the second network element without forwarding the request from the second network element to the third network element, wherein the step of applying a certain predefined rule at the second network element to decide, whether to forward the request from the second network element to decide, whether to forward the request from the second network element to a third network, comprises a step of examining, whether the configuration information stored at the configuration memory of the second network element is older than a predefined time limit, so that the configuration information requested in the request for configuration information is read from a configuration memory of the second network element if it is found to be not older than a certain time limit.

7. A method for achieving configuration information into a network element of an xDSL network that comprises network elements on certain hierarchical levels, the method comprising the steps of:
- transmitting a request for configuration information from a first network element located on a first hierarchical level towards a second network element located on a second hierarchical level, which second hierarchical level is above the first hierarchical level in the xDSL network, said second hierarchical level being at least more than one level higher than the first hierarchical level if the second network element is a network managing station associated with said xDSL network,
- deciding, at the second network element, whether it is appropriate to read the configuration information requested in the request for configuration information from a configuration memory of the second network element, and
- in case it is decided to be appropriate,
- reading the configuration information requested in the request for configuration information from a configuration memory of the second network element and if said second network element is the network managing station, communicating the configuration information to the first network element through a node at a hierarchical level between said second hierarchical level and said first hierarchical level.

8. A method for achieving configuration information into a network element of an xDSL network that comprises network elements on certain hierarchical levels, the method comprising the steps of:
- transmitting a request for configuration information from a first network element located on a first hierarchical level towards a second network element located on a second hierarchical level, which second hierarchical level is above the first hierarchical level in the xDSL network,
- the first network element decides it is appropriate to read the configuration information requested in the request for configuration information from a configuration memory of the first network element if a response is not received from the second network element before the end of a certain time limit; and if it is appropriate for the first network element to read configuration information, the first network element:
- reads the configuration information requested in the request for configuration information from a configuration memory of the first network element.

9. A method for effecting changes into configuration information in an xDSL network that comprises network elements on certain hierarchical levels and a network managing station, the method comprising:
- at a certain first network element that is other than the network managing station and is located on a certain first hierarchical level, receiving a command for changing a piece of configuration information that pertains to a second network element that is located on a certain second hierarchical level, which second hierarchical level is below the first hierarchical level in the xDSL network,
- storing said piece of configuration information at a configuration memory of the first network element in a form that results from executing said received command,
- transmitting a copy of the stored configuration information from said first network element towards said second network element as a command to start using the transmitted configuration information and
- transmitting a copy of the stored configuration information from said first network element towards the network managing station as a report of changed configuration information.

10. A method for effecting changes into configuration information in an xDSL network that comprises network elements on certain hierarchical levels and a network managing station, the method comprising the steps of:
- at a certain first network element that is other than the network managing station and is located on a certain first hierarchical level, receiving a command for changing a piece of configuration information that pertains to a second network element that is located on a certain second hierarchical level, which second hierarchical level is below the first hierarchical level in the xDSL network and
- storing said piece of configuration information at a configuration memory of the first network element in a form that results from executing said received command,
- transmitting a copy of the stored configuration information from said first network element towards said second network element as a command to start using the transmitted configuration information and
- transmitting a copy of the stored configuration information from said first network element towards the network managing station as a report of changed configuration information.
- as a response to the reception of a report or command containing changed configuration information, checking at a third network element, which in the xDSL network is on another hierarchical level than said first hierarchical level, whether an effected change in the changed configuration information is in accordance with a certain required authorisation for making such a change, and
- storing at a configuration memory of said third network element, reported changed configuration information only if all effected changes in the changed configuration information were found to be in accordance with certain required authorisations for making such changes.

* * * * *

UNITED STATES PATENT AND TRADEMARK OFFICE
CERTIFICATE OF CORRECTION

PATENT NO. : 7,266,084 B2  Page 1 of 1
APPLICATION NO. : 09/753236
DATED : September 4, 2007
INVENTOR(S) : Suonsivu et al.

It is certified that error appears in the above-identified patent and that said Letters Patent is hereby corrected as shown below:

1. At column 5, line 17, please insert --,-- after the word "information".

2. At column 6, line 33, please remove the word "certaion" and replace it with --certain--.

3. At column 7, line 35, please remove the word "certaion" and replace it with --certain--.

4. At column 12, line 41, please remove the word "whese" and replace it with --whose--.

5. At column 14, line 43, please remove the phrase "also invention" and replace it with --invention also--.

Signed and Sealed this

Twenty Second Day of April, 2008

JON W. DUDAS
*Director of the United States Patent and Trademark Office*